(12) United States Patent
Kouznetsov et al.

(10) Patent No.: US 7,765,558 B2
(45) Date of Patent: Jul. 27, 2010

(54) SYSTEM AND METHOD FOR HANDLING AN EVENT IN A COMPUTER SYSTEM

(75) Inventors: Oleg Kouznetsov, Palm Beach Gardens, FL (US); Gustav Karlsson, Palm Beach Gardens, FL (US); Helmuth Freericks, Palm Beach Gardens, FL (US)

(73) Assignee: Authentium, Inc., Palm Beach Gardens, FL (US)

( * ) Notice: Subject to any disclaimer, the term of this patent is extended or adjusted under 35 U.S.C. 154(b) by 1308 days.

(21) Appl. No.: 11/175,006

(22) Filed: Jul. 5, 2005

(65) Prior Publication Data

US 2006/0015880 A1    Jan. 19, 2006

Related U.S. Application Data

(60) Provisional application No. 60/585,520, filed on Jul. 6, 2004.

(30) Foreign Application Priority Data

Jul. 8, 2004    (AU) .............................. 2004903759

(51) Int. Cl.
  G06F 9/44    (2006.01)
  H04L 29/06    (2006.01)
(52) U.S. Cl. ...................... 719/318; 713/164
(58) Field of Classification Search ................ 719/310, 719/311, 312, 318; 726/22, 23, 24; 713/164, 713/320; 714/35, 38
See application file for complete search history.

(56) References Cited

U.S. PATENT DOCUMENTS

| | | | | |
|---|---|---|---|---|
| 5,148,544 A * | 9/1992 | Cutler et al. | ................. | 710/261 |
| 6,131,163 A | 10/2000 | Wiegel | | |
| 6,205,492 B1 * | 3/2001 | Shaw et al. | ................. | 719/321 |
| 6,871,350 B2 * | 3/2005 | Wong et al. | ................. | 719/323 |
| 7,000,100 B2 * | 2/2006 | Lacombe et al. | ............... | 713/1 |
| 7,085,928 B1 * | 8/2006 | Schmid et al. | ............. | 713/164 |
| 7,181,382 B2 * | 2/2007 | Shier et al. | .................... | 703/13 |
| 7,363,657 B2 * | 4/2008 | Caccavale | .................... | 726/24 |
| 7,437,759 B1 * | 10/2008 | Szor | ............................ | 726/22 |
| 7,472,272 B2 * | 12/2008 | Stamos et al. | ............... | 713/164 |
| 7,530,093 B2 * | 5/2009 | Samuelsson et al. | ........... | 726/1 |
| 2002/0152331 A1 | 10/2002 | Wong et al. | | |

(Continued)

FOREIGN PATENT DOCUMENTS

WO    WO-03058451    7/2003

*Primary Examiner*—Van H Nguyen
(74) *Attorney, Agent, or Firm*—Fox Rothschild, LLP; Robert J. Sacco

(57) ABSTRACT

Systems for handling an event in a computer system which has a kernel-mode and a user-mode. The systems comprise at least one computing device. The computing device is configured to suspend an occurrence of the event in the kernel-mode of an operating system running thereon. The computing device is also configured to cause the event to occur in the user-mode of the operating system. The computing device is further configured to determine if an occurrence of the event in the kernel-mode will compromise the computer system by analyzing the occurrence of the event in the user-mode. If it is determined that the occurrence of the event in the kernel-mode will compromise the computer system, then the computing device executes at least one security measure.

13 Claims, 5 Drawing Sheets

U.S. PATENT DOCUMENTS

| | | |
|---|---|---|
| 2003/0081601 A1 | 5/2003 | Morris et al. |
| 2003/0101381 A1* | 5/2003 | Mateev et al. ............... 714/38 |
| 2003/0120935 A1 | 6/2003 | Teal et al. |
| 2004/0003137 A1 | 1/2004 | Callender et al. |
| 2004/0098639 A1* | 5/2004 | Liu ........................... 714/35 |
| 2004/0216145 A1* | 10/2004 | Wong et al. ................. 719/321 |
| 2004/0243783 A1* | 12/2004 | Ding et al. .................. 711/170 |
| 2005/0246522 A1* | 11/2005 | Samuelsson et al. ........ 713/150 |
| 2005/0246564 A1* | 11/2005 | Bhesania et al. ............ 713/320 |

* cited by examiner

SYSTEM AND METHOD FOR HANDLING AN EVENT IN A COMPUTER SYSTEM

This application claims the benefit of U.S. Provisional Application No. 60/585,520 filed 6 Jul. 2004 and incorporates the same by reference.

FIELD OF THE INVENTION

The present invention relates generally to a system and method for handling an event in a computer system that has a kernel-mode and a user-mode, and has particular—but by no means exclusive—application to computer security.

BACKGROUND OF THE INVENTION

Today's computer systems commonly employ operating systems that allow a process (software module) to run in either a user-mode or a kernel-mode. Generally speaking, an operating system will not allow the process to perform certain actions when in the user-mode; for example, prevent access to a particular block of memory or prevent an attempt to modify certain data. However, when the process is in the kernel-mode the operating system generally does not place any restrictions on the actions performed by the process; for instance, the process can access a block of memory, which in the user-mode would not be possible.

In view of the fact that a process operating in the kernel-mode generally does not have any restrictions placed on its actions, it is of paramount importance a process operating in the kernel-mode is closely scrutinised to ensure the integrity of the computer systems is not compromised. There are numerous software packages on the market that scrutinise processes in the kernel-mode by analysing their actions. However, these software packages have been designed to operate in the kernel-mode when analysing the actions. Unfortunately, this not only makes the software packages relatively complex, but also has the potential to give rise to significant compatibility problems with other security software, and in some cases, standard software applications.

SUMMARY OF THE INVENTION

According to a first aspect of the present invention, there is provided a system for handling an event in a computer system which has a kernel-mode and a user-mode, the system comprising:

a kernel part that is operable to effect a suspension of the event in the kernel-mode; and a user part that is operable to effect an occurrence of the event in the user-mode, thereby handling the event in the computer system.

Thus, by effecting the occurrence of the event in the user-mode the present invention has the ability to reduce the complexity associated with analysing the event in the kernel-mode. Furthermore, effecting the occurrence of the event in the user-mode has the potential to minimise compatibility problems between security software, and standard software applications.

Preferably, the user part is further operable to influence an operation of the computer system based on the occurrence of the event in the user-mode.

Thus, the ability to influence the operation of the computer system is advantageous because it can be used to overt an action which has the potential to compromise the integrity of the computer system.

Preferably, the user part is operable to influence the operation of the computer system by preventing the event from occurring in the kernel-mode.

Alternatively, the user part is operable to influence an occurrence of the event in the kernel-mode.

Preferably, the user part is operable to issue a request for the suspension, whilst the kernel part is operable to use the request in order to activate a provider part which is operable to effect suspension of a class of events that comprises the event.

Thus, providing the user part with the ability to initiate the suspension of the event when required.

Preferably, the provider part is operable to interact with an operating system of the computer system in order to effect the suspension.

Preferably, the kernel part is operable to issue an indication that the suspension has been effected, whilst the user part is operable to use the indication in effecting the occurrence of the event in the user-mode.

Preferably, the kernel part is operable to use an interprocess communication mechanism to transfer the indication to the user part, the user part being operable to use the interprocess communication mechanism to transfer the indication to the kernel part.

Thus, the interprocess communication mechanism allows the kernel part and the user part to be distinct processes on the computer system.

Preferably, the interprocess communication mechanism uses an Internet protocol.

Thus, using the Internet protocol provides the advantage of allowing the kernel part and the user part to be located on different computers.

Preferably, the kernel part and the user part are operable to respectively format the indication and the request according to a predefined format.

Preferably, the predefined format accords with a common information model defined by a distributed management task force.

Alternatively, the predefined format accords with another format defined by an application program interface.

Preferably, the kernel part operates in the kernel mode, whilst the user part operates in the user-mode.

Preferably, the user part comprises an anti-virus scan engine.

According to a second aspect of the present invention, there is provided a method of handling an event in a computer system which has a kernel-mode and a user-mode, the method comprising the steps of:

effecting a suspension of the event in the kernel-mode; and effecting an occurrence of the event in the user-mode, thereby handling the event in the computer system.

Preferably, the method further comprises the further step of influencing an operation of the computer system based on the occurrence of the event in the user-mode.

Preferably, the step of influencing the operation of the computer system further comprises preventing the event from occurring in the kernel-mode.

Alternatively, the step of influencing the operation of the computer system further comprises influencing an occurrence of the event in the kernel-mode.

Preferably, the method further comprises the steps of:

issuing a request for the suspension; and using the request in order to activate a provider part that is operable to effect suspension of a class of events that comprises the event.

Preferably, the method further comprises the step of using the provider to interact with an operating system of the computer system in order to effect the suspension.

Preferably, the method further comprises the steps of:
issuing an indication that the suspension has been effected; and
using the indication in effecting the occurrence of the event in the user-mode.

Preferably, the method further comprises the step of effecting a transfer of the indication to a user part for use thereby.

Preferably, the step of effecting a transfer of the indication comprises using an interprocess communication mechanism.

Preferably, the interprocess communication mechanism uses an Internet protocol.

Preferably, the method further comprises the step of formatting the indication and the request according to a predefined format.

Preferably, the predefined format accords with a common information model defined by a distributed management task force.

Alternatively, the predefined format accords with another format defined by an application program interface.

According to a third aspect of the present invention, there is provided software, which when executed on a computer, allows the computer to carry out the method according to the second aspect of the present invention.

According to a fourth aspect of the present invention, there is provided a computer readable medium comprising the software according to the third aspect of the present invention.

BRIEF DESCRIPTION OF THE DRAWINGS

Notwithstanding any other embodiments that may fall within the scope of the present invention, an embodiment of the present invention will now be described, by way of example only, with reference to the accompanying figures, in which.

AN EMBODIMENT OF THE INVENTION

Figure 1:
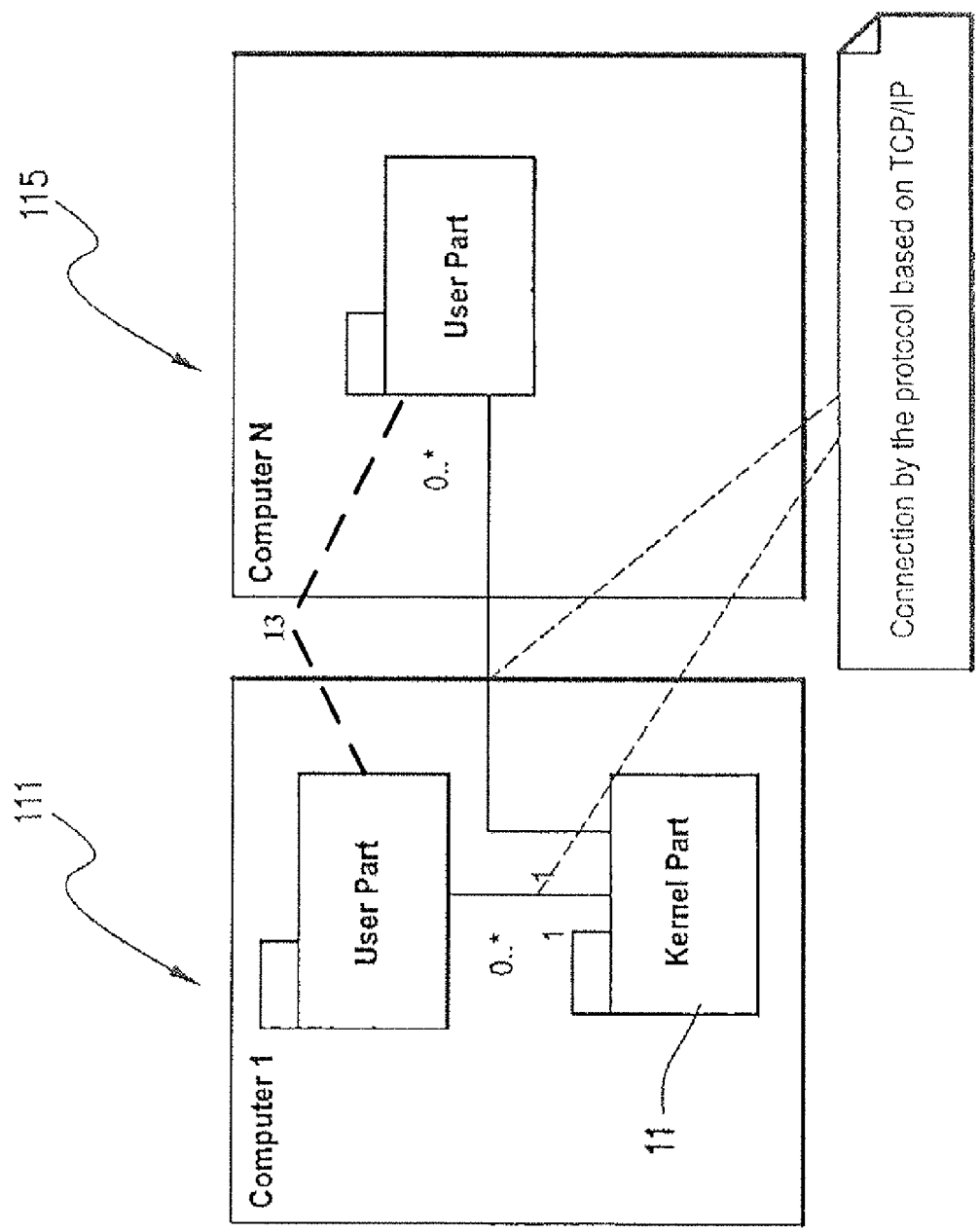
FIG. 1 provides a schematic diagram of the embodiment of the present invention, which comprises a user part and a kernel part.

As can be seen in FIG. 1, the embodiment of the present invention comprises a kernel part 11 and a user part 13.

Figure 2:
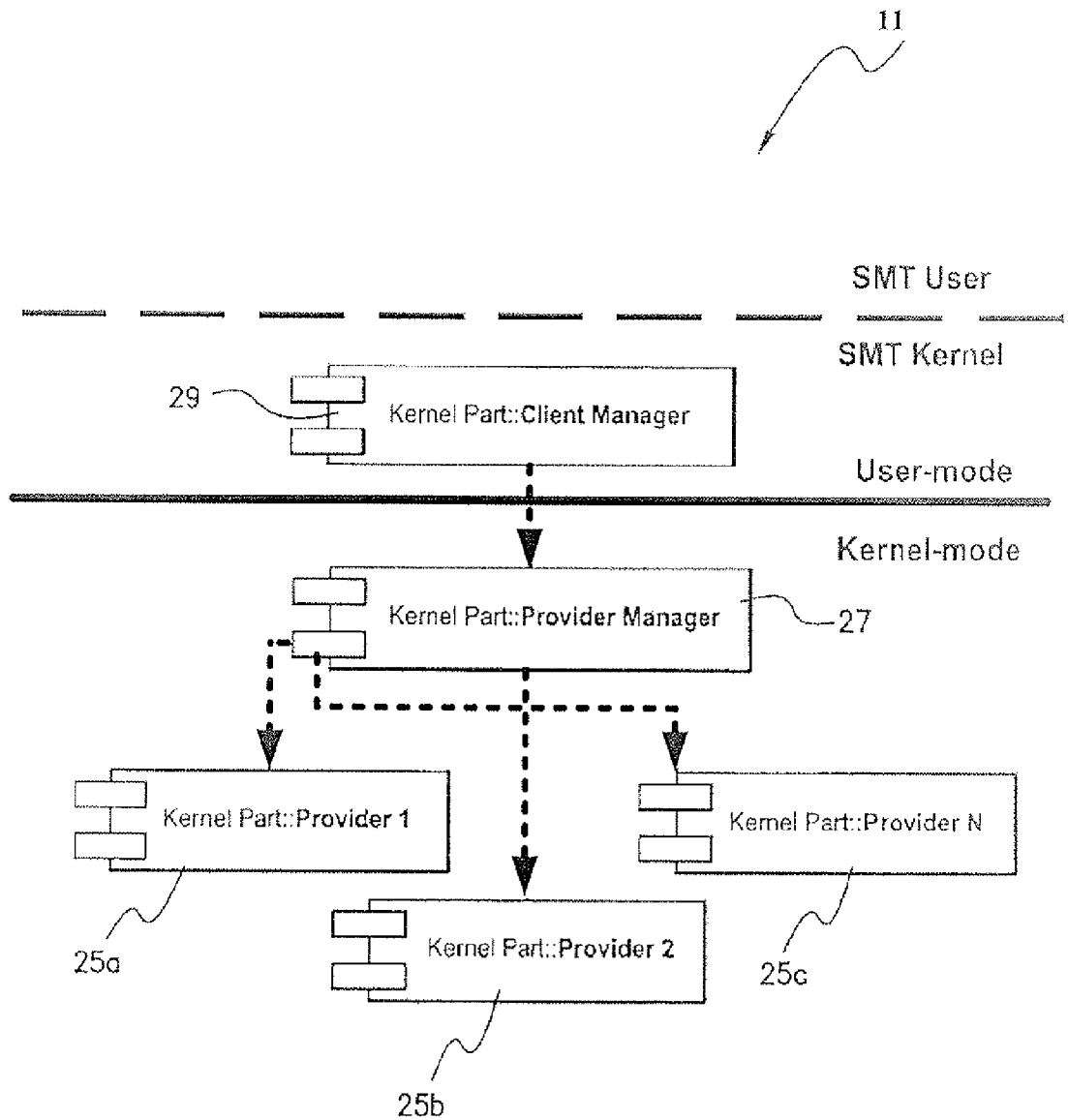
FIG. 2 provides a schematic diagram of the various parts that make-up the kernel part illustrated in FIG. 1.

With reference to FIG. 2, the kernel part 11 comprises three main components: one or more providers 25a, 25b, 25c; a provider manager 27; and a client manager 29. The providers 25a, 25b, 25c and the provider manager 27 are each in the form of a software module (a kernel-mode device driver) that is designed to operate in a kernel-mode of a Windows NT operating system that is being run on a first computer 111 (see FIG. 1). The client manager 29 is also in the form of a software module, but is designed to operate in a user-mode of the Windows NT operating system that is operating on the first computer 111. In the present embodiment of the invention the providers 25a, 25b, 25c, the provider manager 27 and the client manager 29 are developed using C/C++. However, as persons skilled in the art will readily appreciate the providers 25a, 25b, 25c, the provider manager 27 and the client manager 29 could be developed using other languages.

Persons skilled in the art will readily appreciate the differences between the kernel-mode and the user-mode of Windows NT operating system. However, those not skilled in the art are referred to the section of this document entitled "Background of the Invention" for a very brief overview of the basic difference between the kernel-mode and the user-mode.

Figure 3:
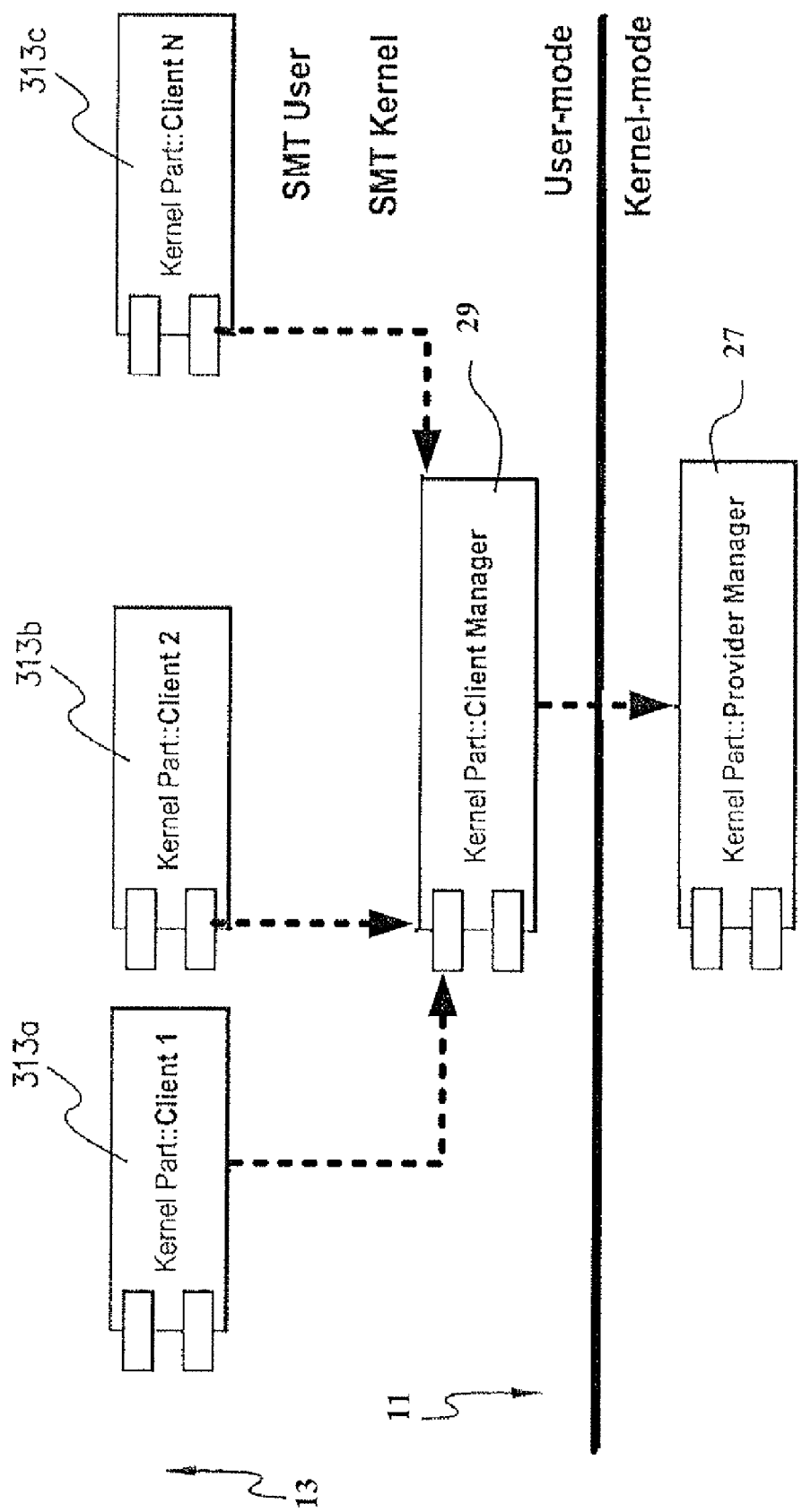
FIG. 3 provides a schematic diagram of the various parts that make-up the user part illustrated in FIG. 1.

As mentioned previously, the embodiment of the present invention also comprises a user part 13, which can be seen in FIG. 1. With reference to FIG. 3, the user part 13 comprises one or more software applications 313a, 313b, 313c. In the present embodiment, the applications 313a, 313b, 313c are developed using C/C++; however it is possible to use other languages. As shown in FIG. 1, the user part 13 can be installed on the first computer 111 and/or a second computer 115, which is also controlled by a Windows NT operating system. The software applications 313a, 131b, 313c are designed to operate in the user-mode of the Windows NT operating system operating on the first and second computers 111 and 115. As is discussed in more detail shortly, each of the software applications 313a, 313b, 313c is a computer anti-virus scan engine that is designed to analyze events scheduled to occur in the kernel-mode of the Windows NT operating system running on the first computer 111, and to execute anti-viral measures on the first computer 111, such as denying file I/O if the analysis of the events indicates that the events may compromise the first computer 111.

Figure 4:
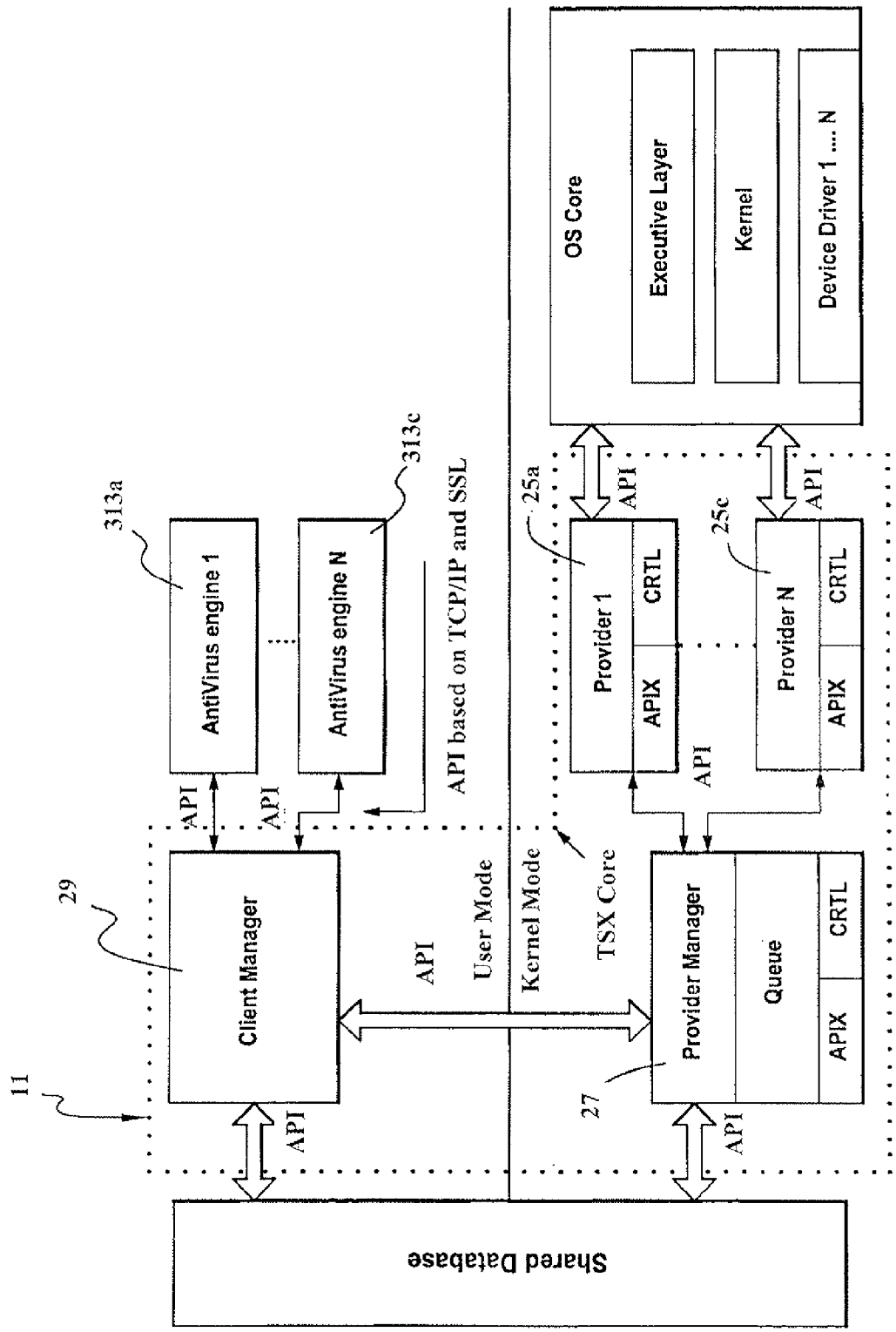
FIG. 4 provides a schematic diagram of the various parts that make-up the user part and kernel part illustrated in FIG. 1.

With reference to the FIG. 4, the software applications 313a, 313b (not shown in FIG. 4), 313c and the kernel part 11 encoded by the dotted line are designed to interact with each other so that the software applications 313a, 313b (not shown in FIG. 4), 313c can analyze the events scheduled to occur in the kernel-mode to the Windows NT operating system running on the first computer 111 (shown in FIG. 1), and to allow the software applications 313a, 313b (not shown in FIG. 4), 313c to initiate anti-viral measures on the first computer 111.

To enable the software applications 313a, 313b (not shown in FIG. 4), 313c and the kernel part 11 to interact with each other, the software applications 313a, 313b (not shown in FIG. 4), 313c and the client manager 29 (which forms part of the kernel part 11) are capable of establishing and maintaining an interprocess communication mechanism between each other. More particularly, the interprocess communication mechanism is such that it is supported by an Internet protocol suite (which is commonly referred to as a TCP/IP protocol suite). An advantage of using the interprocess communication mechanism that is supported by the Internet protocol suite is that it enables the user part 13 to be installed on either the first computer 111 or the second computer 115 and interact with the kernel part 11.

When the software applications 313a, 313b (not shown in FIG. 4), 313c wish to analyze the events that are scheduled to occur in the kernel-mode of the Windows NT operating system on the first computer 111, the software applications 313a, 313b (not shown in FIG. 4), 313c first take the necessary steps to establish the interprocess communication mechanism—which as mentioned previously provides a communication link between the software applications 313a, 313b (not shown in FIG. 4), 313c and the client manager 29.

Once the interprocess communication mechanism has been established between the software applications 313a, 313b (not shown in FIG. 4), 313c and the client manager 29, the software applications 313a, 313b (not shown in FIG. 4), 313c proceed to forward a suspension request (which is in the form of electronic data) to the client manager 29 via the interprocess communication mechanism. The suspension request identifies an event which the software application 313a, 313b (not shown in FIG. 4), 313c is interested in analyzing. The client manager 29 is arranged to store the suspension request in memory, or in an alternative embodiment, a shared database.

Subsequent to receiving the suspension request via the communication mechanism, the client manager 29 advises the provider manager 27 of the event that the suspension request identifies; that is, the event that the software application 313a, 313b (not shown in FIG. 4), 313c is interested in analyzing. In order to advise the provider manager 27 of the event, the client manager 29 invokes a method (software routine) of an application program interface of the provider manager 27.

Upon being advised of the event that the suspension request identifies, the provider manager 27 loads (activates) an appropriate one of the providers 25a, 25b (not shown in FIG. 4), 25c. The provider manager 27 loads the providers 25a, 25b (not shown in FIG. 4), 25c by invoking a method (software routine) of an application program interface associated with the providers 25a, 25b (not shown in FIG. 4), 25c. Each of the providers 25a, 25b (not shown in FIG. 4), 25c are designed to suspend a different class of events that can occur in the kernel-mode of the Windows NT operating system running on the first computer 111 (which is shown in FIG. 1). For example, one of the providers 25a, 25b (not shown in FIG. 4), 25c will be designed to suspend a class of events related to file input/output, whilst another of the providers 25a, 25b (not shown in FIG. 4), 25c will be designed to suspend a class of events related to network input/output. The provider manager 27 loads the provider 25a, 25b (not shown in FIG. 4), 25c that suspends the class of events to which the event (advised by the client manager 29) belongs. The provider manager 27 is also arranged to unload any of the providers 25a, 25b (not shown in FIG. 4), 25c that may have previously loaded.

Once the provider manager 27 has loaded the appropriate provider 25a, 25b (not shown in FIG. 4), 25c, the provider manager 27 instructs the provider 25a, 25b (not shown in FIG. 4), 25c that it requires a particular event to be suspended. To suspend the particular event, the provider 25a, 25b (not shown in FIG. 4), 25c interacts with the Windows NT operating system running on the computer 111 (see FIG. 1) to effect the installation of a kernel-mode handler in the execution path of the Windows NT operating system. In this regard, the providers 25a, 25b (not shown in FIG. 4), 25c are such that they interact with the Windows NT operating system via an application program interface of the operating system. Insertion of the kernel-mode handler will effect suspension of an event that is due to occur in the kernel-mode of the Windows NT operating system.

The handler inserted into the execution path of the Windows NT operating system is such that once it has suspend the relevant event (which is the event identified in the suspension request issued by the software application 313a, 313b (not shown in FIG. 4), 313c), it will notify the provider 25a, 25b (not shown in FIG. 4), 25c which effected the insertion of the kernel-mode handler. The Windows NT operating system notifies the appropriate providers 25a, 25b (not shown in FIG. 4), 25c about the suspension of an event via the application program interface of the operating system.

In response to being notified by the Windows NT operating system that an event in the kernel-mode has been suspended, the providers 25a, 25b (not shown in FIG. 4), 25c obtain information about the suspended event, (from the Windows NT operating system), and forward this information to the provider manager 27 which in turn forwards the information onto the client manager 29. On receiving the information from a provider 25a, 25b (not shown in FIG. 4), 25c, the provider manager 27 places the information into a queue so as to compliment the speed and asynchronous nature of the processing.

The provider manager 27 passes the information onto the client manager 29 by invoking an appropriate method (software routine) in an application program interface of the client manager 29. Using the interprocess communication mechanism connecting the client manager 29 and the software applications 313a, 313b (not shown in FIG. 4), 313c, the client manager 29 forwards the information onto the software application 313a, 313b (not shown in FIG. 4), 313c that requested the corresponding event to be suspended.

The information about the event provides sufficient information to enable to software applications 313a, 313b (not shown in FIG. 4), 313c to cause the event to occur in the user-mode of the Windows NT operating system, which the software applications 313a, 313b (not shown in FIG. 4), 313c do upon receiving the information via the interprocess communication mechanism. More specifically, the information about the event comprises mandatory standard parameters associated with the event. The information can also comprise optional auxiliary information. The information on the mandatory standard parameters include those that are commonly documented in operating system programming guides.

The software applications 313a, 313b (not shown in FIG. 4), 313c are arranged to operate in either a monitoring mode or a processing mode. In the monitoring mode the software applications 313a, 313b (not shown in FIG. 4), 313c monitor the event in the user-mode and collect information about the event. In the monitoring mode, the software applications 313a, 313b (not shown in FIG. 4), 313c do not influence the operation of the Windows NT operating system on the first computer 111. In the processing mode, the software applications 313a, 313b (not shown in FIG. 4), 313c influence the operation of the Windows NT operating system on the first computer 111 based on the occurrence of the event in the user-mode. The software applications 313a, 313b (not shown in FIG. 4), 313c will generally influence the operation of the Windows NT operating system if the occurrence of the event in the user-mode indicates that the event has the potential to compromise the first computer 111 if it occurs in the kernel-mode. The influence which the software applications 313a, 313b (not shown in FIG. 4), 313c have on the Windows NT operating system will depend on the nature of the occurrence of the event in the user-mode, and may for example including denying the ability to write data to a particular file. It is noted that in order to influence the operation of the Windows NT operating system, the software applications 313a, 313b (not shown in FIG. 4), 313c are arranged to issue instructions to the providers 25a, 25b (not shown in FIG. 4), 25c via the client manager 29 and the provider manager 27 in much the same way as the software applications 313a, 313b (not shown in FIG. 4), 313c issue suspension requests. The instructions issued by the software applications 313a, 313b (not shown in FIG. 4), 313c are such that upon processing by the providers 25a, 25b (not shown in FIG. 4), 25c, the providers 25a, 25b (not shown in FIG. 4), 25c interact with the Windows NT operating system to influence the operation of the operating system in accordance with the instructions.

As mentioned previously, the software applications 313a, 313b (not shown in FIG. 4), 313c and the kernel part 11 interact with each other, which involves the software applications 313a, 313b (not shown in FIG. 4), 313c issuing the suspension request and the client manager 29, which in turn sends the software applications 313a, 313b (not shown in FIG. 4), 313c information about suspended events. In this regard, the software applications 313a, 313b (not shown in FIG. 4), 313c and the client manager 29 employ a marshalling process and a de-marshalling process. In the case of the software applications 313a, 313b (not shown in FIG. 4), 313c the marshalling process involves formatting the suspension request according to a predefined format, and in the case of the client manager 29 the marshalling process involves formatting the information about the event according the predefined format. Formatting the suspension request and the information about the event is basically performed so that they can be transferred to each other over the interprocess communication mechanism. The de-marshalling process is simply the reverse of marshalling; that is, it involves the software applications 313a, 313b (not shown in FIG. 4), 313c extracting the information about the event from the predefined format, and the client manager 29 extracting the suspension request from the predefined format.

The predefined format used by the software applications 313a, 313b (not shown in FIG. 4), 313c and the client manager 29 is the common information model defined by the distributed management task force (CIM DMTF). Persons skilled in the art will readily appreciate the details of the CIM DMTF. However, those not skilled in the art are referred to the DMTF Internet site, which is located at www.dmtf.org.

In addition to the previously described functions performed by the provider manager 27, client manager 29, and the software applications 313a, 313b (not shown in FIG. 4), 313c, these components of the embodiment of the present invention provide various other functions. In the case of the client manager 29, it has the ability to provide the software applications 313a, 313b (not shown in FIG. 4), 313c with details of the providers 25a, 25b (not shown in FIG. 4), 25c that are currently loaded, and which can be loaded. Effectively, this allows the software applications 313a, 313b (not shown in FIG. 4), 313c to determine the events (and classes thereof) that can be suspended. In order to be able to provide the software applications 313a, 313b (not shown in FIG. 4), 313c with the details of the providers 25a, 25b (not shown in FIG. 4), 25c, the client manager 29 queries the provider manager 27 via the application program interface thereof. In regard to the provider manager 27, it provides a CIM DMTF library and repository. The software applications 313a, 313b (not shown in FIG. 4), 313c are such that they can interact with each other so as to effect the other applications 313a, 313b (not shown in FIG. 4), 313c ability to process the information about the event, which is forwarded thereto by the client manager 29.

Figure 5:
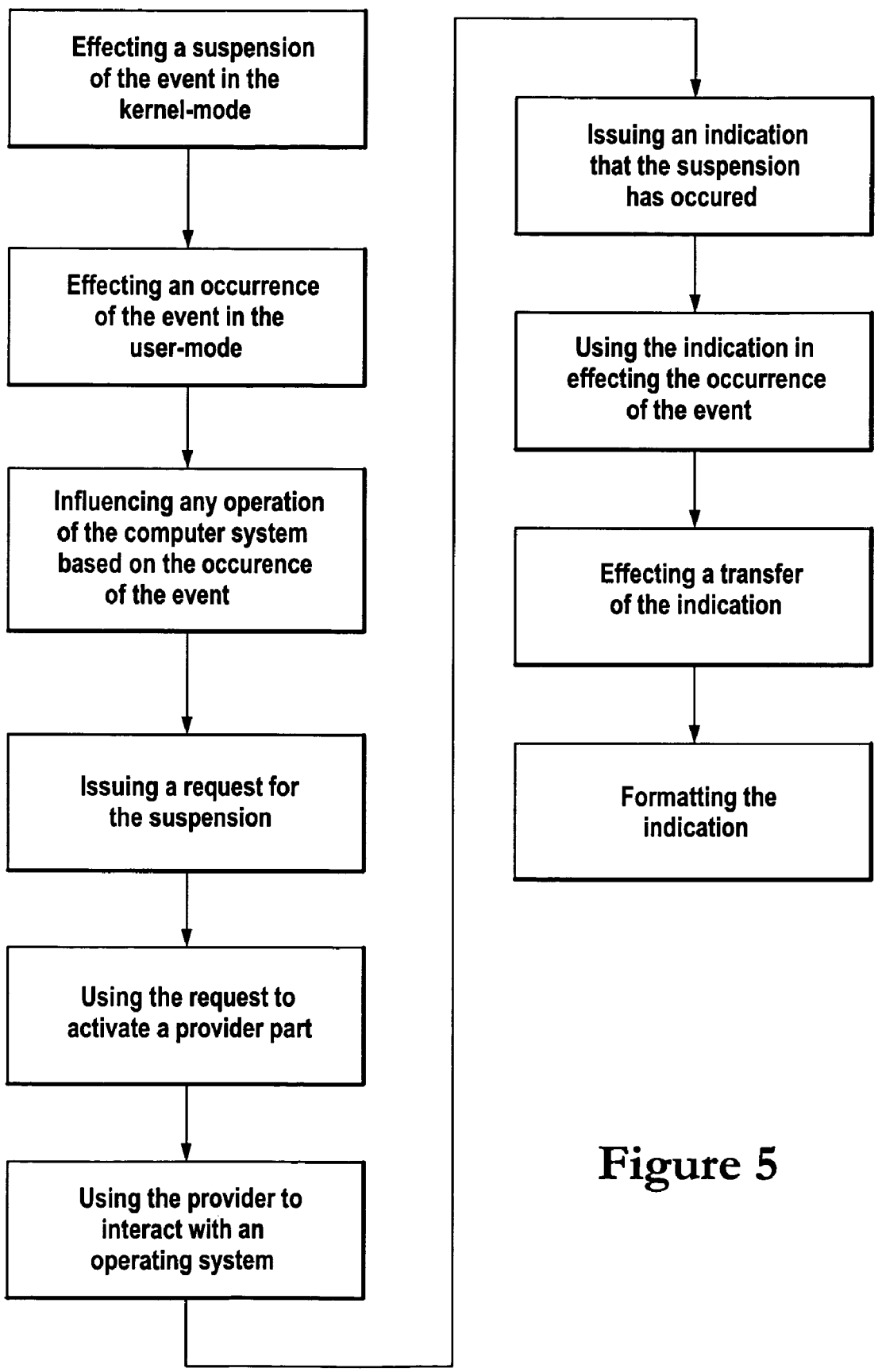
FIG. 5 is a flow chart of the various steps performed by the embodiment of the present invention.

The various steps performed by the embodiment of the present invention are shown in the flow chart of FIG. 5.

It will be appreciated that whilst the previous description of the embodiment of the present invention refers to the Windows NT operating system, the present invention will have application to other operating systems that have a kernel-mode and a user-mode, or similar concept. Examples of another operating systems are UNIX based operating systems. Persons skilled in the art will also appreciate that whilst the present invention has been described in the context of software being executed under the NT operating system, it is possible that the present invention (or parts thereof) could be performed by dedicated hardware.

Those skilled in the art will appreciate that the invention described herein is susceptible to variations and modifications other than those specifically described. It should be understood that the invention includes all such variations and modifications which fall within the spirit and scope of the invention.

The invention claimed is:

1. A system for handling an event in a computer system which has a kernel-mode and a user-mode, the system comprising:
at least one computing device configured to
(a) run a user-mode software application operative to issue a request for a suspension of an occurrence of the event in the kernel-mode,
(b) run a first kernel-mode software module operable to use the request in order to activate a second kernel-mode software module operable to effect suspension of a class of events that comprises the event,
(c) suspend an occurrence of the event in the kernel-mode of an operating system running on said computing device,
(d) cause the event to occur in the user-mode of the operating system,
(e) determine if an occurrence of the event in the kernel-mode will compromise the computer system by analyzing the occurrence of the event in the user-mode, and
(f) execute at least one security measure if it is determined that the occurrence of the event in the kernel-mode will compromise the computer system;
wherein the first kernel-mode software module is further operable to issue an indication that the suspension has been effected, and the user-mode software application is further operable to use the indication in effecting the occurrence of the event in the user-mode.

2. The system as claimed in claim 1, wherein the first kernel-mode software module is further operable to use an interprocess communication mechanism to transfer the indication to the user-mode software application, the user-mode software application being operable to use the interprocess communication mechanism to transfer the request to the first kernel-mode software module.

3. The system as claimed in claim 2, wherein the interprocess communication mechanism uses an Internet protocol.

4. The system as claimed in claim 1, wherein the first kernel-mode software module and the user-mode software application are operable to respectively format the indication and the request according to a predefined format.

5. The system as claimed in claim 4, wherein the predefined format accords with a common information model defined by a distributed management task force.

6. The system as claimed claim 5, wherein the first kernel-mode software module operates in the kernel mode, and the user-mode software application operates in the user-mode.

7. The system as claimed claim 6, wherein the user-mode software application comprises an anti-virus scan engine.

8. A method of handling an event in a computer system which has a kernel-mode and a user-mode, the method comprising the following steps performed by at least one computing device:
issuing a request for a suspension of an occurrence of the event in the kernel-mode;
using the request in order to activate a kernel-mode software module that is operable to effect suspension of a class of events that comprises the event;
effecting the suspension of the occurrence of the event in the kernel-mode of the operating system running on the computer system;
issuing an indication that the suspension has been effected;
effecting the occurrence of the event in the user-mode of the operating, system using the indication;

determining if an occurrence of the event in the kernel-mode will compromise the computer system by analyzing the occurrence of the event in the user-mode; and executing at least one security measure if it is determined that the occurrence of the event in the kernel-mode will compromise the computer system;

wherein the step of executing at least one security measure further comprises influencing an operation of the computer system based on the occurrence of the event in the user-mode; and wherein the operation of the computer system is influenced by preventing the event from occurring in the kernel-mode.

9. The method as claimed in claim 8, further comprising the step of effecting a transfer of the indication to a user-mode software application for use thereby.

10. The method as claimed in claim 9, wherein the step of effecting the transfer of the indication comprises using an interprocess communication mechanism.

11. The method as claimed in claim 10, wherein the interprocess communication mechanism uses an Internet protocol.

12. The method as claimed in claim 8, further comprising the step of formatting the indication and the request according to a predefined format.

13. The method as claimed in claim 12, wherein the predefined format accords with a common information model defined by a distributed management task force.

* * * * *